US012793348B2

(12) United States Patent
Huang et al.

(10) Patent No.: US 12,793,348 B2
(45) Date of Patent: Nov. 10, 2026

(54) MULTI-CAMERA TOGGLING METHOD AND APPARATUS, DEVICE, AND STORAGE MEDIUM

(71) Applicant: Beijing Zitiao Network Technology Co., Ltd., Beijing (CN)

(72) Inventors: Xiangyu Huang, Beijing (CN); Lichen Huang, Beijing (CN); Liyue Ji, Beijing (CN); Peipei Wu, Beijing (CN); Wenhui Zhao, Beijing (CN); Mingkai Xia, Beijing (CN); Xiang He, Beijing (CN)

(73) Assignee: Bejing Zitiao Network Technology Co., Ltd., Beijing (CN)

( * ) Notice: Subject to any disclaimer, the term of this patent is extended or adjusted under 35 U.S.C. 154(b) by 290 days.

(21) Appl. No.: 18/339,680

(22) Filed: Jun. 22, 2023

(65) Prior Publication Data

US 2023/0419613 A1 Dec. 28, 2023

(30) Foreign Application Priority Data

Jun. 22, 2022 (CN) ......................... 202210715285.1

(51) Int. Cl.
*G06T 19/00* (2011.01)
*G06F 3/01* (2006.01)

(52) U.S. Cl.
CPC ............ *G06T 19/003* (2013.01); *G06F 3/017* (2013.01); *G06T 19/006* (2013.01)

(58) Field of Classification Search
CPC ..... G06T 19/003; G06T 19/006; G06F 3/017; G06F 3/012; G06F 3/0346; G06F 3/011;
(Continued)

(56) References Cited

U.S. PATENT DOCUMENTS 5,729,471 A * 3/1998 Jain ...................... H04N 5/2627 348/E13.058
7,196,722 B2 * 3/2007 White .................... H04N 23/66 348/E7.071

(Continued)

FOREIGN PATENT DOCUMENTS

CN 105264480 A 1/2016
WO 2021/228200 A1 11/2021
WO 2021/249414 A1 12/2021

OTHER PUBLICATIONS

Office action received for Chinese patent application No. 202210715285.1 mailed on May 26, 2026, 21 pages (12 pages English Translation and 9 pages Original document).

*Primary Examiner* — Motilewa Good-Johnson

(57) ABSTRACT

Provided are a multi-camera toggling method and apparatus, a device, and a storage medium. The method includes: displaying a multi-camera entry in a virtual space in response to an arousing instruction in the virtual space; entering a multi-camera interface in response to a triggering operation on the multi-camera entry, to display a plurality of cameras that have been configured in the virtual space; and displaying, in the virtual space in response to a toggling instruction for one of target cameras, interactive scene information at the target camera. In the present disclosure, convenient arousing and accurate multi-camera toggling in the virtual space can be realized, thereby avoiding misoperation on multi-camera toggling and enhancing diversity and interest of multi-camera interaction in the virtual space. Furthermore, the interactive scene information can be displayed omnidirectionally in the virtual space through the multi-camera toggling, thereby enhancing the user's omnidirectional immersive experience in the virtual space.

18 Claims, 6 Drawing Sheets

(58) Field of Classification Search
CPC .. H04N 13/243; H04N 13/296; H04N 13/332; H04N 21/2187
See application file for complete search history.

(56) References Cited

U.S. PATENT DOCUMENTS

| | | | | |
|---|---|---|---|---|
| 8,830,230 | B2 * | 9/2014 | Bai | G06T 19/20 345/473 |
| 9,473,758 | B1 * | 10/2016 | Long | H04N 13/275 |
| 9,849,384 | B1 * | 12/2017 | Energin | H04N 21/6587 |
| 10,257,490 | B2 * | 4/2019 | Khalid | H04N 23/698 |
| 11,051,049 | B2 * | 6/2021 | Bustamante | H04N 21/242 |
| 11,140,380 | B2 * | 10/2021 | Oh | H04N 19/597 |
| 11,189,107 | B2 * | 11/2021 | Reif | G06T 15/20 |
| 11,205,360 | B2 * | 12/2021 | Okutani | H04N 7/181 |
| 11,508,125 | B1 * | 11/2022 | Latta | G06T 19/003 |
| 11,769,299 | B1 * | 9/2023 | Stehlik | G06T 7/90 345/419 |
| 11,985,294 | B2 * | 5/2024 | Miyata | H04N 23/60 |
| 12,112,028 | B2 * | 10/2024 | Christie | G06F 3/04847 |
| 2005/0002662 | A1 * | 1/2005 | Arpa | H04N 7/181 396/120 |
| 2014/0038708 | A1 * | 2/2014 | Davison | A63F 13/69 463/31 |
| 2014/0368495 | A1 * | 12/2014 | Wei | H04N 13/117 345/419 |
| 2017/0263058 | A1 | 9/2017 | Muta | |
| 2017/0316639 | A1 * | 11/2017 | Lyons | G07F 17/3244 |
| 2017/0359624 | A1 * | 12/2017 | Englert | H04N 21/25435 |
| 2018/0350136 | A1 * | 12/2018 | Rowley | G06T 7/73 |
| 2019/0083885 | A1 * | 3/2019 | Yee | G06T 15/20 |
| 2019/0213791 | A1 * | 7/2019 | Hanamoto | H04N 5/2224 |
| 2019/0222748 | A1 * | 7/2019 | Weir | G06F 3/0488 |
| 2020/0105174 | A1 * | 4/2020 | Okutani | G06T 15/20 |
| 2021/0065461 | A1 | 3/2021 | Reif | |
| 2021/0233304 | A1 * | 7/2021 | Rowley | H04N 5/2224 |
| 2022/0057926 | A1 * | 2/2022 | Christie | H04N 23/632 |
| 2022/0360865 | A1 * | 11/2022 | Champel | H04N 21/816 |
| 2023/0419613 | A1 * | 12/2023 | Huang | G06F 3/011 |
| 2024/0070215 | A1 * | 2/2024 | Inch | G06F 16/954 |
| 2024/0177435 | A1 * | 5/2024 | Huang | G06T 19/006 |
| 2024/0350913 | A1 * | 10/2024 | Lu | A63F 13/5255 |

* cited by examiner

MULTI-CAMERA TOGGLING METHOD AND APPARATUS, DEVICE, AND STORAGE MEDIUM

CROSS-REFERENCE TO RELATED APPLICATION

This application is based on and claims priority to Chinese Patent Application No. 202210715285.1, filed on Jun. 22, 2022, the entire content of which is incorporated herein by reference.

FIELD

Embodiments of the present disclosure relates to the field of Extended Reality (XR) technologies, in particular, to a multi-camera toggling method and apparatus, a device, and a storage medium.

BACKGROUND

At present, XR technology is widely used in many application scenes, and includes Virtual Reality (VR), Augmented Reality (AR), and Mixed Reality (MR), etc. In virtual live streaming scenes, the XR technology can enable a user to have an immersive experience in various virtual live streaming scenes. For example, the user can experience real live streaming interactive scenes by wearing a Head Mounted Display (HMD).

SUMMARY

Embodiments of the present disclosure provides a multi-camera toggling method and apparatus, a device, and a storage medium, which can realize convenient arousing and accurate multi-camera toggling in a virtual space, enhance diversity and interest of multi-camera interaction in the virtual space, and improve user's omnidirectional immersive experience in the virtual space.

According to one embodiment of the present disclosure, there is provided a multi-camera toggling method applied to an XR apparatus. The multi-camera toggling method includes: displaying a multi-camera entry in a virtual space in response to an arousing instruction in the virtual space; entering a multi-camera interface in response to a triggering operation on the multi-camera entry, to display a plurality of cameras that have been configured in the virtual space; and displaying, in the virtual space in response to a toggling instruction for one of target cameras, interactive scene information at the target camera.

According to one embodiment of the present disclosure, there is provided a multi-camera toggling apparatus configured in an Extended Reality (XR) device. The multi-camera toggling apparatus includes: a multi-camera entry arousing module configured to display a multi-camera entry in a virtual space in response to an arousing instruction in the virtual space; a multi-camera interface display module configured to enter a multi-camera interface in response to a triggering operation on the multi-camera entry to display a plurality of cameras that have been configured in the virtual space; and a multi-camera toggling module configured to display, in the virtual space in response to a toggling instruction for one of the target cameras, interactive scene information at the target camera.

According to one embodiment of the present disclosure, there is provided an electronic device includes a processor and a memory configured to store a computer program. The processor is configured to call and execute the computer program stored on the memory to perform the multi-camera toggling method as described in the above embodiments.

According to one embodiment of the present disclosure, there is provided a computer-readable storage medium for storing a computer program. The computer program causes a computer to perform the multi-camera toggling method as described in the above embodiments.

According to one embodiment of the present disclosure, there is provided a computer program product including a computer program/instruction. The computer program/instruction causes a computer to perform the multi-camera toggling method as described in the above embodiments.

According to the embodiments of the present disclosure, when the arousing instruction is received in the virtual space, the multi-camera entry is displayed in the virtual space to support the triggering operation on the multi-camera entry from a user to enter the multi-camera interface. Further, the plurality of cameras that has been configured in the virtual space are displayed on the multi-camera interface. Then, by acquiring the toggling instruction for one of the target cameras on the multi-camera interface, the interactive scene information at the target camera can be displayed in the virtual space. Therefore, the convenient arousing and accurate multi-camera toggling in the virtual space can be realized, thereby avoiding misoperation of the multi-camera toggling. Thus, diversity and interest of the multi-camera interaction in the virtual space can be enhanced. In addition, the interactive scene information from different view angles can be displayed omni-directionally in the virtual space through the multi-camera toggling, enhancing user's omnidirectional immersive experience in the virtual space.

BRIEF DESCRIPTION OF DRAWINGS

In order to more clearly illustrate the technical solutions of the embodiments of the present disclosure, a brief description will be given below of the accompanying drawings which are required for the description of the embodiments. It is obvious that the drawings in the description below are only some embodiments of the present disclosure, and it would be obvious for a person skilled in the art to obtain other drawings based on these drawings without involving any inventive effort.

DESCRIPTION OF EMBODIMENTS

Figure 1:
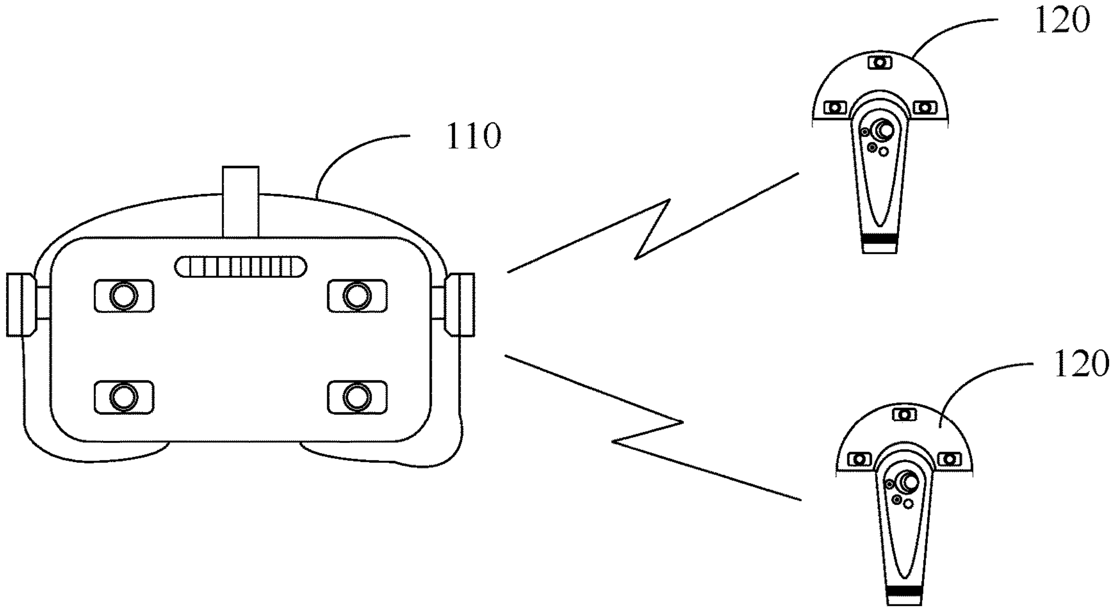
FIG. 1 is an application scene diagram according to an embodiment of the present disclosure.

The technical solutions in embodiments of the present disclosure will be described clearly and completely in conjunction with the accompanying drawings in the embodiments of the present disclosure. Obviously, the described embodiments are only a part, rather than all of the embodiments of the present disclosure. Based on the embodiments of the present disclosure, all other embodiments obtained by a person of ordinary skill in the art without inventive effort fall within the scope of the present disclosure.

It is noted that the terms "first", "second", and the like in the description, claims, and the aforementioned figures, are used for distinguishing between similar objects and not necessarily for describing a particular sequential or chronological order. It is to be understood that the term used in this way are interchangeable under appropriate circumstances such that the embodiments of the invention described herein are capable of operation in sequences other than those illustrated or otherwise described herein. Furthermore, the terms "comprise", "include" and "have", as well as any variations thereof, are intended to cover a non-exclusive inclusion, such that a process, method, system, article, or server that includes a list of steps or elements is not necessarily limited to those steps or elements expressly listed, but may include other steps or elements not expressly listed or inherent to such process, method, article, or device.

In the embodiments of the present disclosure, the word "exemplary" or "such as" is used to indicate that an example, instance, or illustration is being made, and any embodiment or scheme described as "exemplary" or "such as" in the present embodiments is not to be construed as preferred or advantageous over other embodiments or schemes. Rather, the use of the words "exemplary" or "such as" is intended to present related concepts in a specific manner.

Generally, a plurality of different cameras are provided in a virtual live streaming scene, so that a corresponding interactive scene picture can be omni-directionally displayed in a virtual space by toggling the cameras. Therefore, it is urgently needed to design a scheme to achieve convenient and accurate multi-camera toggling in the virtual space.

In order to achieve convenient and accurate multi-camera toggling in the virtual space, embodiments of the present disclosure is to arouse a multi-camera entry in the virtual space and to trigger the multi-camera entry to enter a multi-camera interface, thereby supporting accurate toggling from one of target cameras and display interactive scene information at the target camera in the virtual space.

Before discussing the technical solution of the present disclosure, an extended reality (XR) device for displaying an interactive scene by providing a virtual space for a user (which may include various virtual space products such as VR, AR, and MR) will be described first. The XR device is mainly used to simulate various real environments and integrate corresponding virtual scene information to provide an immersive three-dimensional virtual environment to the user.

It should be understood that the present disclosure may be applied to the following scenes. However, the present disclosure is not limited in this regard.

FIG. 1 is an application scene diagram according to an embodiment of the present disclosure. As shown in FIG. 1, an XR device may include a Head Mounted Display (HMD) 110 and a handheld controller 120. Communication between the HMD 110 and the handheld controller 120 is possible. A virtual space for realizing various types of interactive scenes is provided to the user through the HMD 110, and multi-camera toggling operations in the virtual space is enabled through the handheld controller 120.

In some implementations, the HMD 110 may be a head-mounted display in a VR all-in-one machine, and the present disclosure is not limited thereto.

In some implementations, the handheld controller 120 may be a handheld controller in the VR all-in-one machine, and the present disclosure is not limited thereto.

It should be understood that the number of the HMD 110 and handheld controller 120 in FIG. 1 is merely illustrative and that, in fact, any number of HMDs 110 and handheld controller s 120 may be provided as desired, and the present disclosure is not limited thereto.

In this case, a user may enter the virtual space generated by merged real scene and virtual scene after wearing the HMD 110 of the XR device. Furthermore, in order to ensure omnidirectional live streaming interaction in a real scene, a panoramic camera is usually provided for each of different cameras in the real scene to acquire real scene information at this camera. Therefore, based on the camera distribution in the real scene, a corresponding camera is also provided in the virtual space to ensure omnidirectional interaction in the virtual space. In this case, one of the cameras in the virtual space may also acquire corresponding virtual scene information to be merged with the real scene information at the same camera in the real scene. Thus, interactive scene information at this camera can be obtained, thereby displaying the interactive scene information at one of the cameras in the virtual space.

Meanwhile, the handheld controller 120 is displayed in the virtual space in a cursor ray form, and movement of the cursor ray in the virtual space is controlled by detecting various operations performed via the handheld controller 120 by the user.

It should be appreciated that the cursor ray of the handheld controller 120 may serve as a reference for multi-camera toggling in the virtual space to determine the associated multi-camera operation performed in the virtual space.

After discussing the present disclosure scene of the embodiment of the present disclosure, some embodiments of the present disclosure will be described below in detail.

Figure 2:
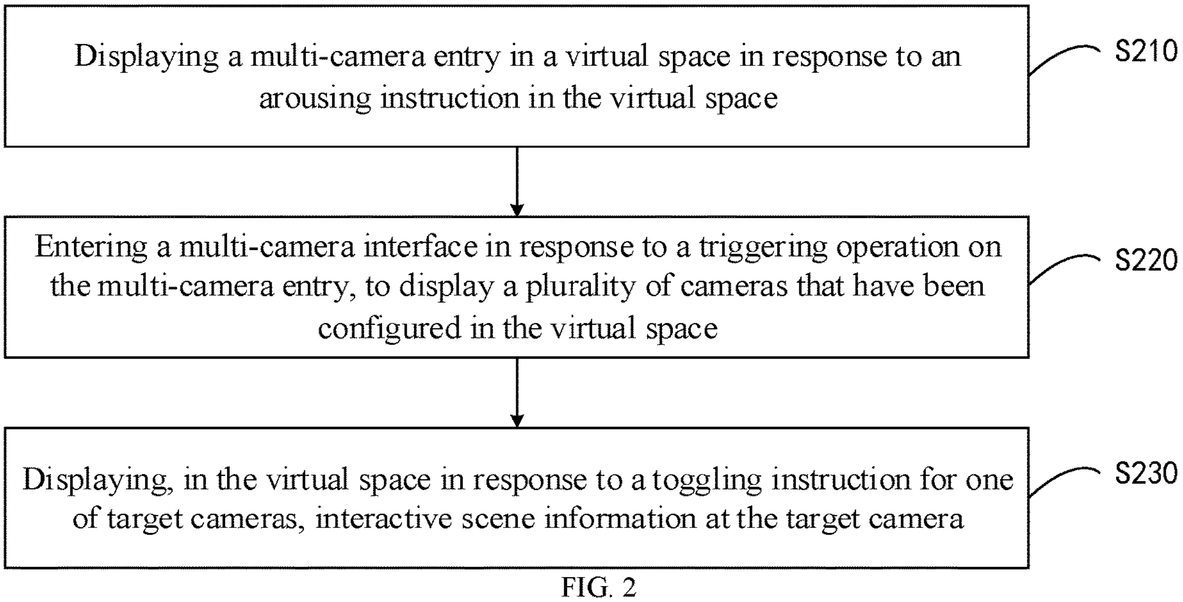
FIG. 2 is a flowchart of a multi-camera toggling method according to an embodiment of the present disclosure.

FIG. 2 is a flowchart of a multi-camera toggling method according to an embodiment of the present disclosure. The method can be applied to an XR device, and the present disclosure is limited thereto. The method may be performed by a multi-camera toggling apparatus according to embodiments of the present disclosure. The multi-camera toggling apparatus may be implemented by any software and/or hardware. Exemplary, the multi-camera toggling apparatus may be configured in an electronic device such as AR/VR/MR, that is capable of simulating the virtual scene, and the specific type of electronic device is not limited in the present disclosure.

In some embodiments of the present disclosure, as shown in FIG. 2, the method may include operations at S210 to S230.

At S210, a multi-camera entry is displayed in a virtual space in response to an arousing instruction in the virtual space.

The virtual space may be a virtual environment with a corresponding camera simulated by the XR device for any real scene with a plurality of cameras. Thus, scene information at any camera can be displayed in the virtual space. For example, the virtual space may be a virtual live streaming environment enabling a user to view VR live streaming at different cameras, or the like.

According to one or more embodiments of the present disclosure, interactive scene information at one of the cameras can be displayed omni-directionally in the virtual space through the multi-camera toggling. Therefore, in order to realize multi-camera toggling in the virtual space, the multi-camera entry is set in the virtual space according to the embodiments of the present disclosure.

In general, the multi-camera entry in the virtual space is hidden to avoid various types of scene information displayed in the virtual space from being covered.

Figure 3:
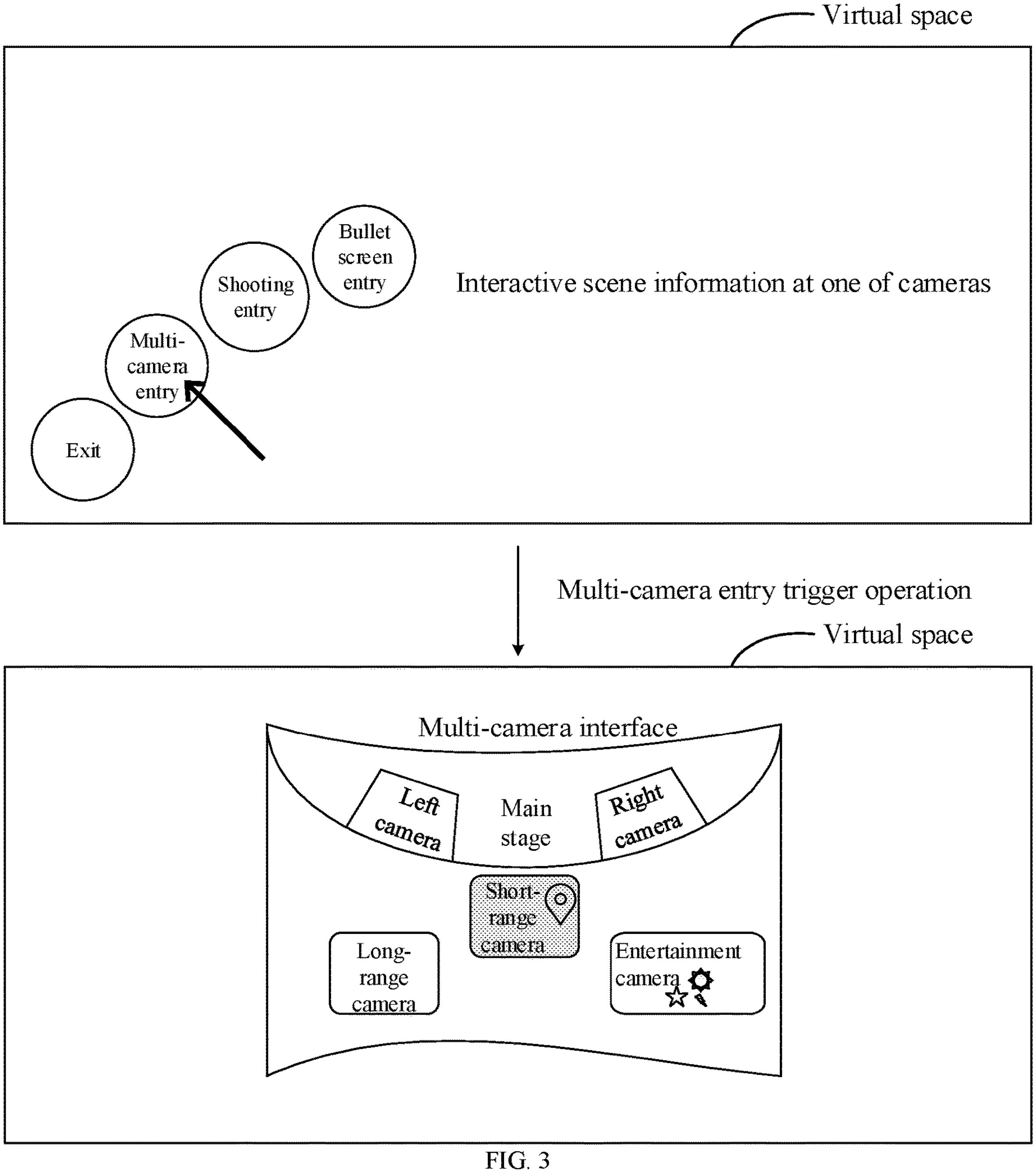
FIG. 3 is a schematic diagram of a scene in which a multi-camera interface is entered in a virtual space according to an embodiment of the present disclosure.

When the multi-camera toggling is required in the virtual space, a corresponding arousing operation is performed by the user to trigger a normal display of the multi-camera entry in the virtual space. In one example, when it is detected that the arousing operation is performed by the user, a corresponding arousing instruction is generated. Then, as shown in FIG. 3, in response to the arousing instruction, in order to conveniently perform the multi-camera toggling operation, the multi-camera entry is aroused in the virtual space so that the multi-camera entry is normally displayed.

In some alternative implementations, the multi-camera entry may be aroused in the virtual space in a direct pop-up display manner.

According to some embodiments of the present disclosure, the multi-camera entry may be aroused at different locations in the virtual space using a predetermined animation effect.

Arousing the multi-camera entry using the predetermined animation effect in the virtual space may include, but is not limited to, the following situations.

In a first situation, the multi-camera entry may be displayed from any edge orientation of the virtual space and zoomed in until being fully displayed.

In a second situation, the multi-camera entry may be gradually displayed from any edge orientation of the virtual space based on a predetermined display trajectory.

In some embodiments of the present disclosure, the arousing instruction in the virtual space may be acquired by entering the virtual space and acquiring the arousing instruction. The arousing instruction may include at least an input signal of the handheld controller or an operation gesture from the user.

That is, after wore by a user, the XR device is turned on to be in an operation state. Further, the XR device can simulate a virtual environment with a corresponding camera for the user, so that the user can enter the corresponding virtual space. Then, the arousing instruction for the virtual space is acquired by detecting an input signal of the handheld controller or the operation gesture from the user in real-time.

For example, the arousing instruction in the virtual space may be generated by clicking an input signal generated by a different touch key (e.g. a trigger key, etc.) on the handheld controller or performing a different operation gesture using the handheld controller by the user.

It should be understood that according to the embodiments of the present disclosure, other function entries for other interactive functions may also be set in the virtual space. In response to the arousing instruction in the virtual space, various function entries may be displayed in the virtual space to support the implementation of corresponding interactive functions in the virtual space by selectively triggering any one of the displayed function entries.

In some implementations, all functional entries in the virtual space may be aroused through the same arousing instruction in the virtual space. It is also possible to set a different arousing instruction for each function entry so that different function entries are aroused in the virtual space based on different arousing instructions, and the present disclosure is not limited thereto.

At S220, a multi-camera interface is entered in response to a triggering operation on the multi-camera entry, to display a plurality of cameras that have been configured in the virtual space.

After the multi-camera entry is displayed in the virtual space, when the triggering operation on the multi-camera entry from the user is detected, a corresponding triggering instruction is generated. Then, in response to the trigger instruction, the multi-camera interface is entered in the virtual space. Also, the plurality of cameras that have been configured in the virtual space can be displayed on the multi-camera interface.

It should be noted that the plurality of cameras that have been configured in the virtual space are set based on the various cameras provided in the desired real interaction scene. Therefore, the number of the plurality of cameras configured in the virtual space simulated for different real scenes may be different from each other.

In an example, in order to ensure camera distribution consistency between the virtual space and the real scene, in an embodiments of the present disclosure, each camera can be displayed on the multi-camera interface in such a manner that a corresponding multi-camera distribution map is displayed on the multi-camera interface based on a relative position of each of the plurality of cameras to a main stage in the virtual space.

That is, considering that the plurality of cameras in the real scene are all used for acquiring scene information about the main stage and displaying the information in the virtual space, the main stage is thus first simulated in the virtual space as a background of the multi-camera interface. Then, the relative position of each camera to the main stage in the virtual space can be determined by analyzing relative position relationship of each camera to the main stage in the real scene. Furthermore, based on a position of the main stage in the virtual space and the relative position of each camera to the main stage, the multi-camera distribution map in the virtual space can be determined. Finally, as shown in FIG. 3, after the multi-camera interface is entered, the background of the multi-camera interface is set based on the position of the main stage. Then, the multi-camera distribution map is directly displayed on the background on the multi-camera interface to display the plurality of cameras in the virtual space based on the respective camera distributions.

It should be noted that after entering the virtual space, a predetermined camera at which the user is usually located id determined as a current camera. Therefore, after each camera is displayed on the multi-camera interface, the current camera is also displayed into a successful positioning state. For example, the current camera is highlighted on the multi-camera interface, and a corresponding positioning icon is displayed on the current camera.

It should be understood that with regard to each camera displayed on the multi-camera interface, except for the current camera being in a non-manipulable state, all the other cameras are in a manipulable state to support subsequent multi-camera toggling in the virtual space by triggering any other camera by the user.

Furthermore, it is considered that there are various types of cameras in the virtual space, such as a short-range camera, a long-range camera, an on-stage camera, an entertainment camera, etc. thus, in order to accurately distinguish types of the cameras in the virtual space, different types of cameras on the multi-camera interface according to the embodiments of the present disclosure also have different display styles on the multi-camera interface. As shown in FIG. 3, the on-stage cameras may be represented as a trapezoid, and off-stage cameras may be represented as a rectangle. Further, the off-stage cameras may be divided into a common audience camera and the entertainment camera. Then, the rectangle for representing the ordinary audience camera is not specifically identified, while the entertainment camera is represented by the rectangle. In addition, a corresponding entertainment pattern may be added in the rectangle to mark a under layer.

At S230, in response to a toggling instruction for one of target cameras, interactive scene information at the target camera is displayed in the virtual space.

After each camera is displayed on the multi-camera interface, the user can be supported to toggle to the target camera by triggering one of the target cameras, and the interactive scene information at the target camera is displayed in the virtual space.

Here, the target cameras may be cameras other than the current camera.

Furthermore, in order to ensure the omnidirectional live streaming interaction in the real scene, one panoramic camera is usually provided for each of different cameras in the real scene to acquire real scene information at the cameras. Furthermore, based on the camera distribution in the real scene, the corresponding camera is also simulated in the virtual space, to ensure that the cameras in the virtual space and the real scene are consistent with each other. Therefore, virtual scene information from a corresponding viewing can also be acquired by any camera in the virtual space and will be merged with real scene information at the same camera in the real scene, to obtain interactive scene information at this camera. In this way, the interactive scene information at one of the cameras in the virtual space can be determined.

The interactive scene information at one of the cameras may be a VR live streaming video.

According to one or more embodiments of the present disclosure, the toggling instruction for one of the target cameras may be that the user moves a selection cursor to an icon of one of the target cameras on the multi-camera interface using the handheld controller, and selects the target camera to toggle by pressing a confirm key of the handheld controller. The selection cursor is displayed in the virtual space in a ray form for pointing to the target camera from which the user wishes to toggle in the virtual space by the user. For example, the selection cursor may be an arrow in the virtual space that, when pointing to the target camera on the multi-camera interface, indicates that the object from which the user wishes to toggle in the virtual space is the target camera.

In response to a toggling instruction for one of the target cameras, the virtual scene information at the target camera and real scene information at the same target camera in the real scene are acquired in real-time. Then, the virtual scene information and real scene information at the target camera are merged to obtain the interactive scene information at the target camera. Further, the interactive scene information at the target camera is toggled and displayed in the virtual space, thereby realizing the convenient and accurate multi-camera toggling in the virtual space and avoiding misoperation on the multi-camera toggling.

According to the embodiments of the present disclosure, if the arousing instruction is received in the virtual space, then the multi-camera entry is displayed in the virtual space to support the triggering operation on the multi-camera entry by the user to enter the multi-camera interface, and the plurality of cameras that have been configured in the virtual space is displayed on the multi-camera interface. Then, by acquiring the toggling instruction for the target camera on the multi-camera interface, the interactive scene information at the target camera can be displayed in the virtual space, thereby realizing the convenient arousing and accurate multi-camera toggling in the virtual space and avoiding the misoperation on the multi-camera toggling. As a result, the diversity and interest of the multi-camera interaction in the virtual space can be enhanced. Furthermore, the interactive scene information from different view angles can be displayed omni-directionally in the virtual space through multi-camera toggling, thereby enhancing the user's omnidirectional immersive experience in the virtual space.

In some other embodiments of the present disclosure, considering that when toggling from one camera to another camera is performed and it is necessary to re-acquire the displayed interactive scene information after toggling in the virtual space, there may be a predetermined interactive display delay. Therefore, in order to ensure a smooth toggling display of interactive scene information in the virtual space, the present disclosure may include the following steps for displaying the interactive scene information at the target camera in the virtual space.

At a first step, the interactive scene information at the target camera during animation display is acquired by displaying a predetermined transition layer animation in the virtual space.

The predetermined transition layer animation may be an animation effect for a smooth transition of the interactive scene in the virtual space set when toggling from one camera to another camera. For example, the predetermined transition layer animation may be a flickering animation lasting for a few seconds, a simulated-eye-closing animation, or and like, and the present disclosure is not limited thereto.

In response to the toggling instruction for one of the target cameras, the predetermined transition layer animation can be displayed on a top graph layer in the virtual space to acquire interactive scene information at the toggled target camera during the animation display, thereby avoiding the interactive display delay when the interactive scene information at the target camera is displayed instantly.

Figure 4:
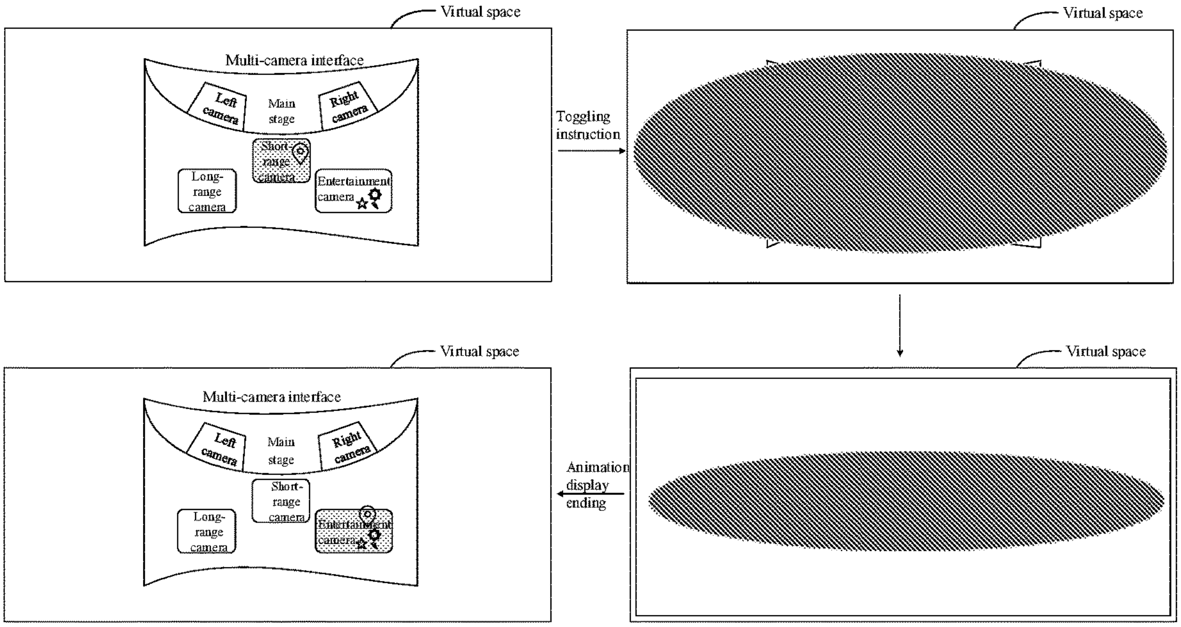
FIG. 4 is a schematic diagram of a multi-camera toggling scene according to an embodiment of the present disclosure.

As shown in FIG. 4, a description will be set forth by taking a simulated-eye-closing animation as an example. If the toggling instruction for any one of the target cameras on a multi-camera interface is detected, the predetermined transition layer animation is displayed in the virtual space.

In a second step, the interactive scene information at the target camera is displayed in the virtual space subsequent to an end of the displaying of the predetermined transition layer animation.

Subsequent to the end of the displaying of the predetermined transition layer animation, the interactive scene information at the target camera has been acquired. Then, as shown in FIG. 4, the interactive scene information at the target camera can be displayed immediately in the virtual space, so as to ensure the smooth toggling display of the interactive scene information in the virtual space.

Figure 5:
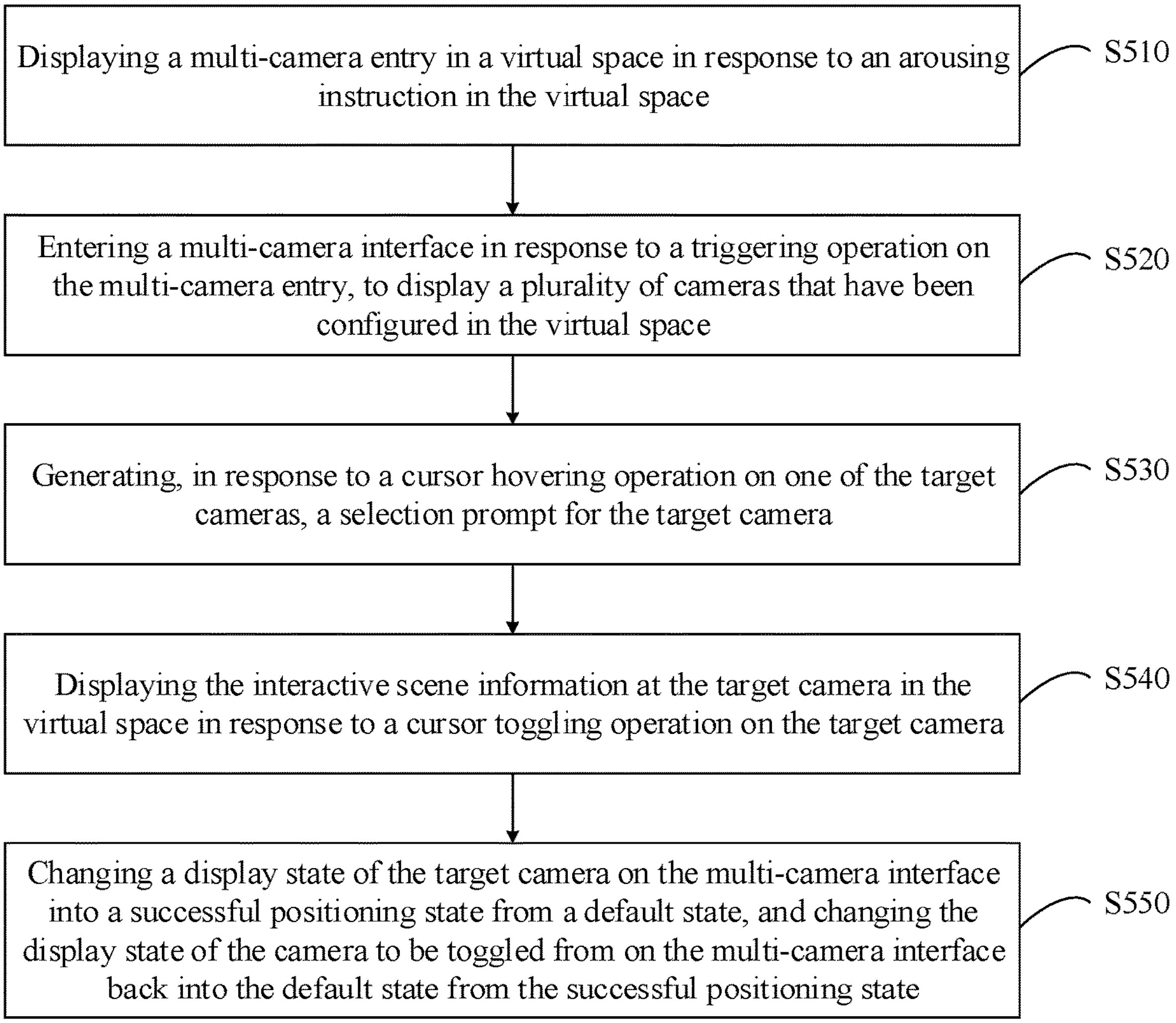
FIG. 5 is another flowchart of a multi-camera toggling method according to an embodiment of the present disclosure.

According to one or more embodiments of the present disclosure, operations related to performing the multi-camera toggling are triggered on the multi-camera interface by means of the cursor ray. With reference to FIG. 5, a method for performing a multi-camera toggling on the multi-camera interface will be described below.

As shown in FIG. 5, this method may include operations at S510 to S550.

At S510, a multi-camera entry is displayed in a virtual space in response to an arousing instruction in the virtual space.

At S520, a multi-camera interface is entered in response to a triggering operation on the multi-camera entry, to display a plurality of cameras that have been configured in the virtual space.

At S530, in response to a cursor hovering operation on one of the target cameras, a selected prompt for the target camera is generated.

Considering that a corresponding multi-camera toggling is triggered by the cursor ray on the multi-camera interface, the user may operate the cursor to hover over one of the target cameras on the multi-camera interface to indicate that a toggling to the target camera is currently required.

Thus, if the cursor hover operation on one of the target cameras on the multi-camera interface is detected, the user may be prompted for a toggling need for the target camera by changing the display effect of this target camera on the multi-camera interface. In addition, according to the predetermined display effect transformation for the multi-camera toggling, a selection prompt for the target camera can be generated.

The selection prompt for the target camera may include at least one of the display state change of the target camera on the multi-camera interface and a vibration effect of the target camera.

Figure 6:
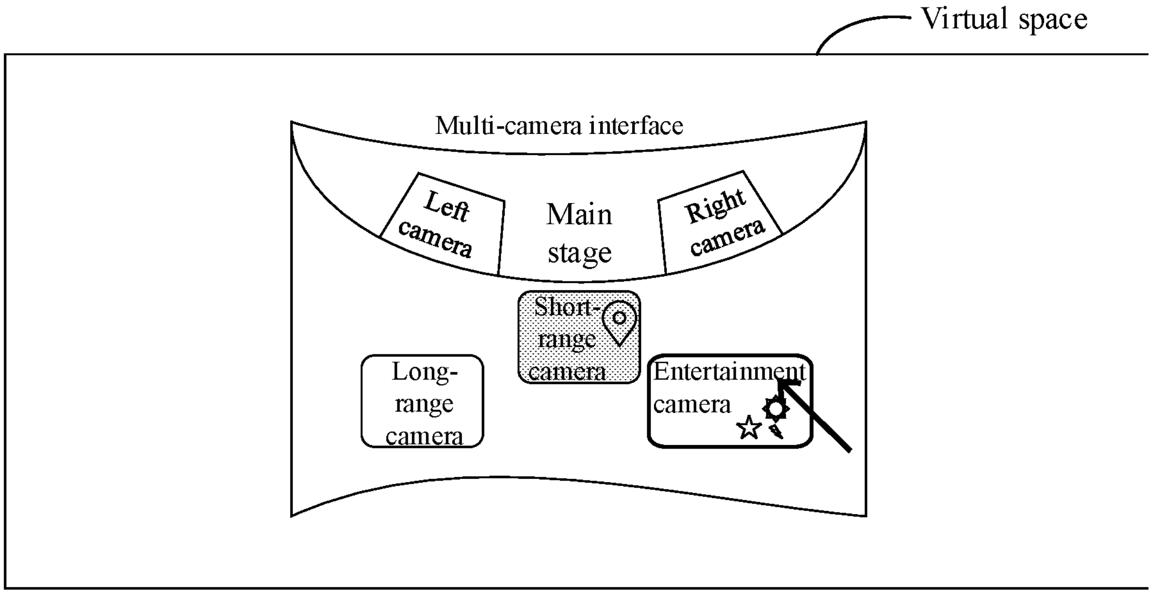
FIG. 6 is a schematic diagram of a scene in which a cursor hovers over a target camera according to an embodiment of the present disclosure.

For example, as shown in FIG. 6, subsequent to the cursor hovering on one of the target cameras on the multi-camera interface, the target camera can be controlled to display corresponding magnification, stroke, projection, or gradual change, or highlight the name of the target camera, etc. Also, the selection information of the target camera may be fed back through vibration.

At S540, the interactive scene information at the target camera is displayed in the virtual space in response to a cursor toggling operation on the target camera.

Subsequent to the cursor hovering over one of the target cameras, the user may perform a cursor toggle operation on the target camera by clicking on a different touch key on the handheld controller, such as a trigger key.

It should be noted that after the cursor toggling operation on the target camera is detected, the toggling information of the target camera is also fed back through the vibration.

The toggling instruction for the target camera may be generated in response to the cursor toggling operation on the target camera. According to the toggling instruction, the interactive scene information at the target camera is acquired in real-time. Furthermore, the interactive scene information at the target camera is toggled and displayed in the virtual space, so as to realize the convenient and accurate multi-camera toggling in the virtual space.

At S550, the display state of the target camera on the multi-camera interface is changed into a successful positioning state from a default state, and the display state of the un-toggled camera on the multi-camera interface is changed back into the default state from the successful positioning state.

The default state of one of the cameras on the multi-camera interface may be an initial display style of this camera. The successful positioning state may be a state in which the camera is highlighted and a corresponding positioning mark icon or the like is provided on the camera.

Figure 7:
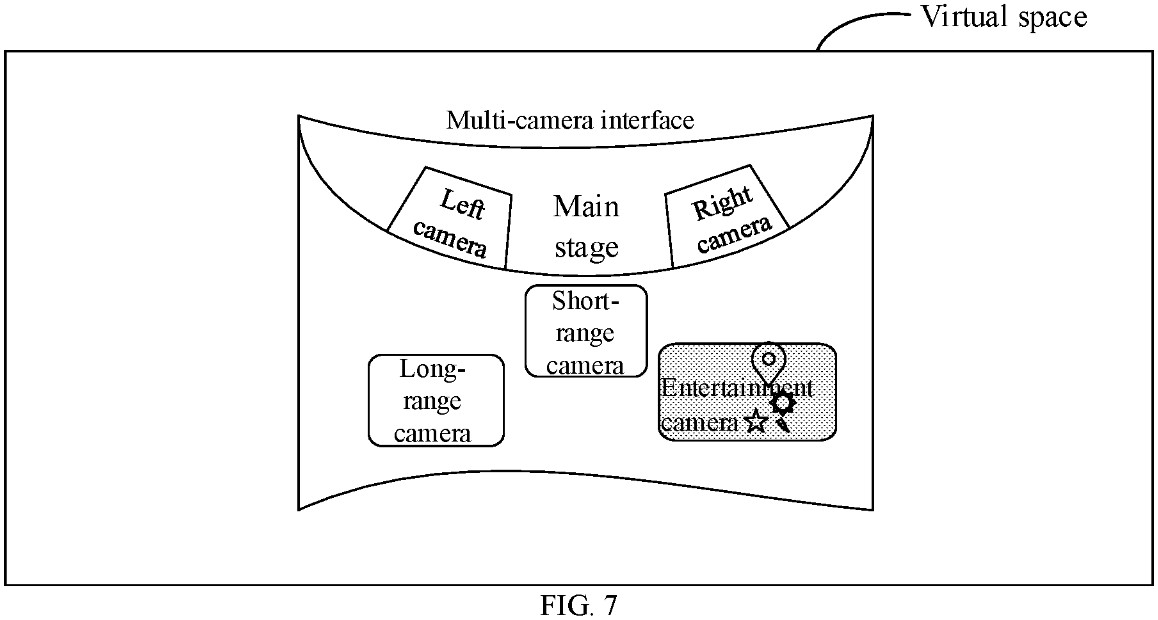
FIG. 7 is a schematic diagram of a scene in which a display status of a target camera is changed according to an embodiment of the present disclosure.

Therefore, in response to the cursor toggling operation on the target camera, as shown in FIG. 7, the display state of the target camera may be changed into the successful positioning state from the default state on the multi-camera interface, to change the display state of the camera to be toggled back into the default state from the successful positioning state.

According to the embodiments of the present disclosure, display states of the target camera at different stages can be displayed when toggling from the current camera to one of the target cameras on the multi-camera interface, to ensure intuition of the multi-camera toggling and enhance diversity and interest of the multi-camera interaction in the virtual space.

Figure 8:
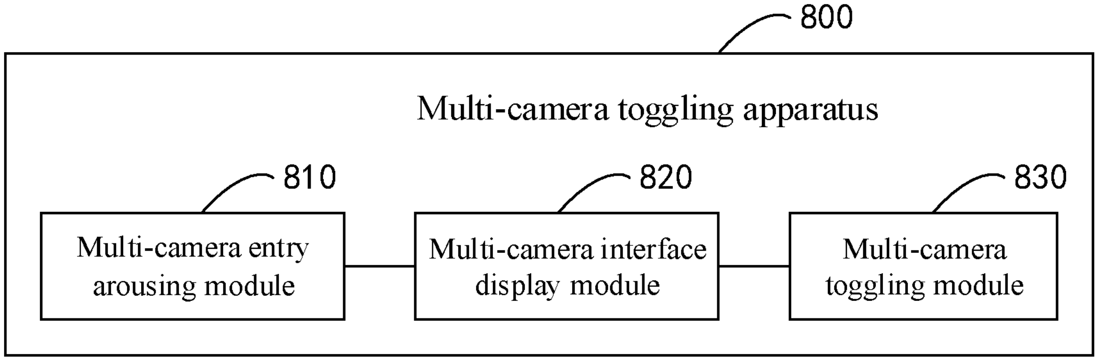
FIG. 8 is a schematic diagram of a multi-camera toggling apparatus according to an embodiment of the present disclosure.

FIG. 8 is a schematic diagram of a multi-camera toggling apparatus 800 according to an embodiment of the present disclosure. The multi-camera toggling apparatus 800 may be configured in an XR device, and includes a multi-camera entry arousing module 810, a multi-camera interface display module 820, and a multi-camera toggling module 830.

The multi-camera entry arousing module 810 is configured to display a multi-camera entry in a virtual space in response to an arousing instruction in the virtual space 810.

The multi-camera interface display module 820 is configured to enter a multi-camera interface in response to a triggering operation on the multi-camera entry, to display a plurality of cameras that have been configured in the virtual space.

The multi-camera toggling module 830 is configured to display, in response to a toggling instruction for one of target cameras, interactive scene information at the target camera in the virtual space.

In some implementations, the multi-camera toggling module 830 may be further configured to generate, in response to a cursor hovering operation on the target camera, a selection prompt for the target camera, and display the interactive scene information at the target camera in the virtual space in response to a cursor toggling operation on the target camera. The target cameras are cameras other than a camera to be toggled from on the multi-camera interface.

In some implementations, the selected prompt for the target camera includes at least one of display state change of the target camera on the multi-camera interface and a vibration effect for the target camera.

In some implementations, the multi-camera toggling apparatus 800 may further include a display state change module. The display state change module may be configured to change a display state of the target camera on the multi-camera interface into a successful positioning state from a default state, and change the display state of the camera to be toggled from on the multi-camera interface back into the default state from the successful positioning state.

In some implementations, the multi-camera toggling module 830 may be further configured to acquire the interactive scene information at the target camera during animation display by displaying a predetermined transition layer animation in the virtual space, and display the interactive scene information at the target camera in the virtual space subsequent to an end of the displaying of the predetermined transition layer animation.

In some implementations, cameras of different types on the multi-camera interface are displayed on the multi-camera interface in different patterns.

In some implementations, the multi-camera interface display module 820 may be further configured to a corresponding multi-camera distribution map on the multi-camera interface based on a relative position of each of the plurality of cameras to a main stage in the virtual space.

In some implementations, the multi-camera toggling apparatus 800 may further include a virtual space entry module configured to enter the virtual space, and an arousing instruction acquisition module configured to acquire an arousing instruction. The arousing instruction includes at least an input signal of a handheld controller or an operation gesture from a user.

According to the embodiments of the present disclosure, when the arousing instruction is received in the virtual space, the multi-camera entry is displayed in the virtual space to support the triggering operation on the multi-camera entry from a user to enter the multi-camera interface. Further, the plurality of cameras that has been configured in the virtual space are displayed on the multi-camera interface. Then, by acquiring the toggling instruction for one of the target cameras on the multi-camera interface, the interactive scene information at the target camera can be displayed in the virtual space. Therefore, the convenient arousing and accurate multi-camera toggling in the virtual space can be realized, thereby avoiding misoperation of the multi-camera toggling. Thus, diversity and interest of the multi-camera interaction in the virtual space can be enhanced. In addition, the interactive scene information from different view angles can be displayed omni-directionally in the virtual space through the multi-camera toggling, enhancing user's omni-directional immersive experience in the virtual space.

It should be understood that the apparatus embodiments may correspond to the method embodiments of the present disclosure and that similar descriptions may refer to the method embodiments of the present disclosure, and thus the description in detail will be omitted herein.

The multi-camera toggling apparatus illustrated in FIG. 8 can perform any of the method embodiments herein, and the foregoing and other operations and/or functions of the various modules in the multi-camera toggling apparatus illustrated in FIG. 8 are provided in order to implement the corresponding flows of the method embodiments described above, and the description thereof in detail will be omitted herein for the sake of brevity.

The above-mentioned method embodiments of the embodiments of the present disclosure are described above based on functional modules with reference to the accompanying drawings. It is to be understood that the functional blocks may be implemented in the form of hardware, software, or a combination thereof. In particular, the steps of an embodiment of a method in an embodiment of the present disclosure may be performed by instructions in the form of integrated logic circuits in hardware and/or software in a processor, and the steps of a method disclosed in connection with the embodiments of the present disclosure may be performed directly by a hardware decoding processor or by a combination of hardware and software modules in a decoding processor. In an example, the software module may reside in a random access memory, flash memory, read-only memory, programmable read-only memory, electrically erasable programmable memory, registers, or the like as is well known in the art. The storage medium is located in a memory, and the processor reads the information in the memory and, in conjunction with its hardware, performs the steps in the above-mentioned method embodiments.

Figure 9:
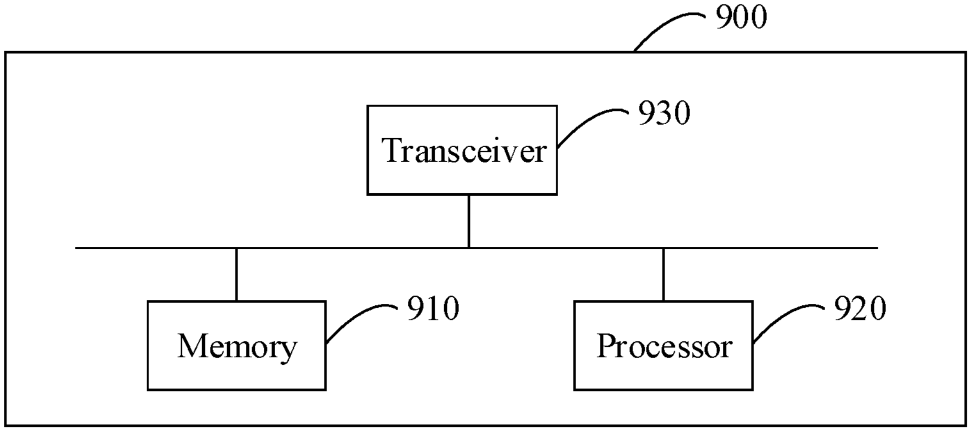
FIG. 9 is a schematic block diagram of an electronic device according to an embodiment of the present disclosure.

FIG. 9 is a schematic block diagram of an electronic device according to an embodiment of the present disclosure.

As shown in FIG. 9, the electronic device 900 may include a memory 910 and a processor 920. The memory 910 is configured to store a computer program and transmit the program code to the processor 920. In other words, the processor 920 may invoke and execute computer programs from the memory 910 to implement the method in embodiments of the present disclosure.

For example, the processor 920 may be configured to perform the method embodiments described above based on the instruction on the computer program.

In some embodiments of the present disclosure, the processor 920 may include, but is not limited to a general purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, or the like.

In some embodiments of the present disclosure, the memory 910 includes, but is not limited to a volatile memory and/or a non-volatile memory. The non-volatile memory may be a Read-Only Memory (ROM), a Programmable ROM (PROM), an Erasable PROM (EPROM), an Electrically EPROM (EEPROM), or a flash memory. The volatile memory can be a random access memory (RAM), which acts as external cache memory. By way of illustration and not limitation, many forms of RAM are available such as Static RAM (SRAM), Dynamic RAM (DRAM), Synchronous DRAM (SDRAM), Double Data Rate SDRAM (DDR SDRAM), Enhanced SDRAM (ESDRAM), synch link DRAM (SLDRAM), and Direct Rambus RAM (DR RAM).

In some embodiments of the present disclosure, the computer program may be divided into one or more modules that are stored on the memory 910 and executed by the processor 920 to perform the method herein. One or more modules may be a series of computer program instruction segments capable of performing specific functions to describe the execution of the computer program in the electronic device 900.

As shown in FIG. 9, the electronic device 900 may further include a transceiver 930. The transceiver 930 may be connected to the processor 920 or the memory 910.

The processor 920 can control the transceiver 930 to communicate with other devices. In an embodiment, the processor 920 can send or receive information or data to or from other devices. The transceiver 930 may include a transmitter and a receiver. The transceiver 930 may further include one or more antennas.

It will be appreciated that the various components of the electronic device 900 are connected by a bus system that includes a power bus, a control bus, and a status signal bus in addition to a data bus.

The present disclosure also provides a computer storage medium having a computer program stored thereon. The computer program, when executed by a computer, enables the computer to perform the method according to the above embodiments.

Embodiments of the present disclosure also provide a computer program product including instructions which, when executed by a computer, cause the computer to perform the methods according to the above embodiments.

When implemented in software, the computer program product may be implemented in whole or in part as a computer program product. The computer program product includes one or more computer instructions. The computer program instructions, when loaded and executed on a computer, result in whole or in part in, in processes or functions according to embodiments of the present disclosure. The computer may be a general-purpose computer, a special-purpose computer, a computer network, or other programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center by wire (e.g. coaxial cable, fiber optic, digital subscriber line (DSL)) or wirelessly (e.g. infrared, wireless, microwave, etc.). The computer-readable storage medium can be any available medium that the computer can access or a data storage device such as a server or data center that contains one or more available media integrations. The usable medium may be a magnetic medium (e.g. floppy disk, hard disk, magnetic tape), an optical medium (e.g. digital video disc, DVD), or a semiconductor medium (e.g. solid state disk, SSD), etc.

While the present disclosure has been described with reference to the preferred embodiments thereof, it will be understood by those skilled in the art that various changes or substitutions may be made without departing from the scope of the invention. Therefore, the scope of the present disclosure should be defined by claims.

What is claimed is:

1. A multi-camera toggling method, applied to an extended reality (XR) device, the XR device comprising a Head Mounted Display (HMD) and a handheld controller in communication with the HMD, the multi-camera toggling method comprising:

entering a virtual space provided by the HMD, wherein the virtual space comprises a virtual live steaming environment that enables a user to view a VR live streaming video from a plurality of cameras that have been configured in the virtual space;

acquiring an arousing instruction in the virtual space by detecting an input signal of the handheld controller or an operation gesture from the user in real-time, wherein the arousing instruction is indicative of a toggling need for the plurality of cameras that have been configured in the virtual space;

displaying a hidden multi-camera entry in the virtual space in response to the arousing instruction in the virtual space;

entering a multi-camera interface in response to a triggering operation on the multi-camera entry, to display the plurality of cameras; and displaying, in the virtual space in response to a toggling instruction for one of target cameras in the plurality of cameras, interactive scene information at the target camera, wherein the interactive scene information is the VR live streaming video from a view angle of the target camera.

2. The multi-camera toggling method according to claim 1, wherein said displaying, in the virtual space in response to the toggling instruction for one of target cameras in the plurality of cameras, the interactive scene information at the target camera comprises:

generating, in response to a cursor hovering operation on the one of the target cameras, a selection prompt for the target camera; and displaying the interactive scene information at the target camera in the virtual space in response to a cursor toggling operation on the target camera, wherein the target cameras are cameras other than a camera to be toggled from on the multi-camera interface.

3. The multi-camera toggling method according to claim 2, wherein the selection prompt for the target camera comprises at least one of a display state change of the target camera on the multi-camera interface and a vibration effect for the target camera.

4. The multi-camera toggling method according to claim 1, wherein said displaying, in the virtual space in response to the toggling instruction for the one of the target cameras in the plurality of cameras, the interactive scene information at the target camera further comprises:

changing a display state of the target camera on the multi-camera interface into a successful positioning state from a default state; and changing the display state of the camera to be toggled from on the multi-camera interface back into the default state from the successful positioning state.

5. The multi-camera toggling method according to claim 1, wherein said displaying in the virtual space the interactive scene information at the target camera comprises:

acquiring the interactive scene information at the target camera during animation display by displaying a predetermined transition layer animation in the virtual space; and displaying the interactive scene information at the target camera in the virtual space subsequent to an end of the displaying of the predetermined transition layer animation.

6. The multi-camera toggling method according to claim 1, wherein cameras of different types on the multi-camera interface are displayed on the multi-camera interface in different patterns.

7. The multi-camera toggling method according to claim 1, wherein said displaying the plurality of cameras comprises:

displaying a corresponding multi-camera distribution map on the multi-camera interface based on a relative position of each of the plurality of cameras to a main stage in the virtual space.

8. A non-transitory computer program product comprising instructions, wherein the computer program product, when executed on an electronic device, causes the electronic device to perform the multi-camera toggling method according to claim 1.

9. An electronic device, applied to an extended reality (XR) device, the XR device comprising a Head Mounted Display (HMD) and a handheld controller in communication with the HMD, the electronic device comprising:

a processor; and a memory configured to store executable instructions by the processor, wherein the processor is configured to, when executing the executable instructions, cause the electronic device to:

enter a virtual space provided by the HMD, wherein the virtual space comprises a virtual live steaming environment that enables a user to view a VR live streaming video from a plurality of cameras that have been configured in the virtual space;

acquire an arousing instruction in the virtual space by detecting an input signal of the handheld controller or an operation gesture from the user in real-time, wherein the arousing instruction is indicative of a toggling need for the plurality of cameras that have been configured in the virtual space;

display a hidden multi-camera entry in the virtual space in response to the arousing instruction in the virtual space;

enter a multi-camera interface in response to a triggering operation on the multi-camera entry, to display the plurality of cameras; and display, in the virtual space in response to a toggling instruction for one of target cameras in the plurality of cameras, interactive scene information at the target camera, wherein the interactive scene information is the VR live streaming video from a view angle of the target camera.

10. The electronic device according to claim 9, wherein said displaying, in the virtual space in response to the toggling instruction for the one of the target cameras in the plurality of cameras, the interactive scene information at the target camera comprises:

generating, in response to a cursor hovering operation on the one of the target cameras, a selection prompt for the target camera; and displaying the interactive scene information at the target camera in the virtual space in response to a cursor toggling operation on the target camera, wherein the target cameras are cameras other than a camera to be toggled from on the multi-camera interface.

11. The electronic device according to claim 10, wherein the selection prompt for the target camera comprises at least one of a display state change of the target camera on the multi-camera interface and a vibration effect for the target camera.

12. The electronic device according to claim 9, wherein said displaying, in the virtual space in response to the toggling instruction for the one of the target cameras in the plurality of cameras, the interactive scene information at the target camera further comprises:

changing a display state of the target camera on the multi-camera interface into a successful positioning state from a default state; and changing the display state of the camera to be toggled from on the multi-camera interface back into the default state from the successful positioning state.

13. The electronic device according to claim 9, wherein said displaying in the virtual space the interactive scene information at the target camera comprises:

acquiring the interactive scene information at the target camera during animation display by displaying a predetermined transition layer animation in the virtual space; and displaying the interactive scene information at the target camera in the virtual space subsequent to an end of the displaying of the predetermined transition layer animation.

14. The electronic device according to claim 9, wherein cameras of different types on the multi-camera interface are displayed on the multi-camera interface in different patterns.

15. The electronic device method according to claim 9, wherein said displaying the plurality of cameras comprises:

displaying a corresponding multi-camera distribution map on the multi-camera interface based on a relative position of each of the plurality of cameras to a main stage in the virtual space.

16. A non-transitory computer-readable storage medium, applied to an extended reality (XR) device, the XR device comprising a Head Mounted Display (HMD) and a handheld controller in communication with the HMD, the non-transitory computer-readable storage medium having a computer program stored thereon, wherein the computer program, when executed by a processor, causes the processor to:

enter a virtual space provided by the HMD, wherein the virtual space comprises a virtual live steaming environment that enables a user to view a VR live streaming video from a plurality of cameras that have been configured in the virtual space;

acquire an arousing instruction in the virtual space by detecting an input signal of the handheld controller or an operation gesture from the user in real-time, wherein the arousing instruction is indicative of a toggling need for the plurality of cameras that have been configured in the virtual space;

display a hidden multi-camera entry in the virtual space in response to the arousing instruction in the virtual space;

enter a multi-camera interface in response to a triggering operation on the multi-camera entry, to display the plurality of cameras; and display, in the virtual space in response to a toggling instruction for one of target cameras in the plurality of cameras, interactive scene information at the target camera, wherein the interactive scene information is the VR live streaming video from a view angle of the target camera.

17. The non-transitory computer-readable storage medium according to claim 16, wherein the computer program, when executed by a processor, further causes the processor to:

generate, in response to a cursor hovering operation on the one of the target cameras, a selection prompt for the target camera; and display the interactive scene information at the target camera in the virtual space in response to a cursor toggling operation on the target camera, wherein the target cameras are cameras in the other than a camera to be toggled from on the multi-camera interface.

18. The non-transitory computer-readable storage medium according to claim 17, wherein the selection prompt for the target camera comprises at least one of a display state change of the target camera on the multi-camera interface and a vibration effect for the target camera.

* * * * *